(12) United States Patent
Takayama et al.

(10) Patent No.: US 12,406,690 B1
(45) Date of Patent: Sep. 2, 2025

(54) LIGHT SOURCE UNIT, THERMALLY ASSISTED MAGNETIC HEAD, HEAD GIMBAL ASSEMBLY, AND HARD DISK DRIVE

(71) Applicant: SAE Magnetics (H.K.) Ltd., Hong Kong (CN)

(72) Inventors: Seiichi Takayama, Hong Kong (CN); Ryuji Fujii, Hong Kong (CN); Tai Boon Lee, Hong Kong (CN); Ka Yip Wong, Hong Kong (CN)

(73) Assignee: SAE MAGNETICS (H.K.) LTD., Hong Kong (CN)

( * ) Notice: Subject to any disclaimer, the term of this patent is extended or adjusted under 35 U.S.C. 154(b) by 0 days.

(21) Appl. No.: 18/807,684

(22) Filed: Aug. 16, 2024

(30) Foreign Application Priority Data

Feb. 29, 2024 (CN) .......................... 202410228557.4

(51) Int. Cl.
*G11B 5/31* (2006.01)
*G11B 7/12* (2012.01)
*G11B 5/00* (2006.01)

(52) U.S. Cl.
CPC ............ *G11B 5/314* (2013.01); *G11B 5/3163* (2013.01); *G11B 2005/0021* (2013.01)

(58) Field of Classification Search
CPC ..... G11B 5/4826; G11B 5/4853; G11B 7/126; G11B 7/128; G11B 7/1245; G11B 7/124; G11B 11/10; G11B 11/105; G11B 2005/0021; G11B 33/123; G11B 33/127

USPC ......................................................... 360/59
See application file for complete search history.

(56) References Cited

U.S. PATENT DOCUMENTS

| | | | |
|---|---|---|---|
| 8,325,566 B2 | 12/2012 | Shimazawa et al. | |
| 10,152,992 B1 * | 12/2018 | Hosoi | G11B 5/6088 |
| 10,943,613 B1 * | 3/2021 | Hosoi | G11B 5/3906 |

OTHER PUBLICATIONS

"Four methods for integrating lasers onto chips", Xunshiguang Communication Network Release, with English translation, May 14, 2023, 18 pages.

* cited by examiner

*Primary Examiner* — Nabil Z Hindi
(74) *Attorney, Agent, or Firm* — Nixon & Vanderhye, P.C.

(57) ABSTRACT

The disclosure disclose a light source unit applied to the thermally assisted magnetic head. A welding layer and a stopping structure are disposed between the slider of the thermally assisted magnetic head and the light source unit. When the light source unit is joined with the slider, the light source unit moves as the welding layer melts and can be precisely limited at the preset position by the stopping structure. In this way, the emission opening of the light source unit and the waveguide can be aligned precisely, thereby increasing the optical coupling efficiency between the light source unit and the waveguide. Meanwhile, the embodiment of the disclosure further accordingly provides a thermally assisted magnetic head, a head gimbal assembly, and a hard disk drive.

15 Claims, 8 Drawing Sheets

LIGHT SOURCE UNIT, THERMALLY ASSISTED MAGNETIC HEAD, HEAD GIMBAL ASSEMBLY, AND HARD DISK DRIVE

CROSS-REFERENCE TO RELATED APPLICATIONS

This application claims priority to CN 202410228557.4 filed Feb. 29, 2024, the entire contents of which are hereby incorporated by reference.

TECHNICAL FIELD

The present disclosure relates to the technical field of hard disk drives, more particularly to a light source unit, a thermally assisted magnetic head, a head gimbal assembly, and a hard disk drive.

BACKGROUND

Figure 1:
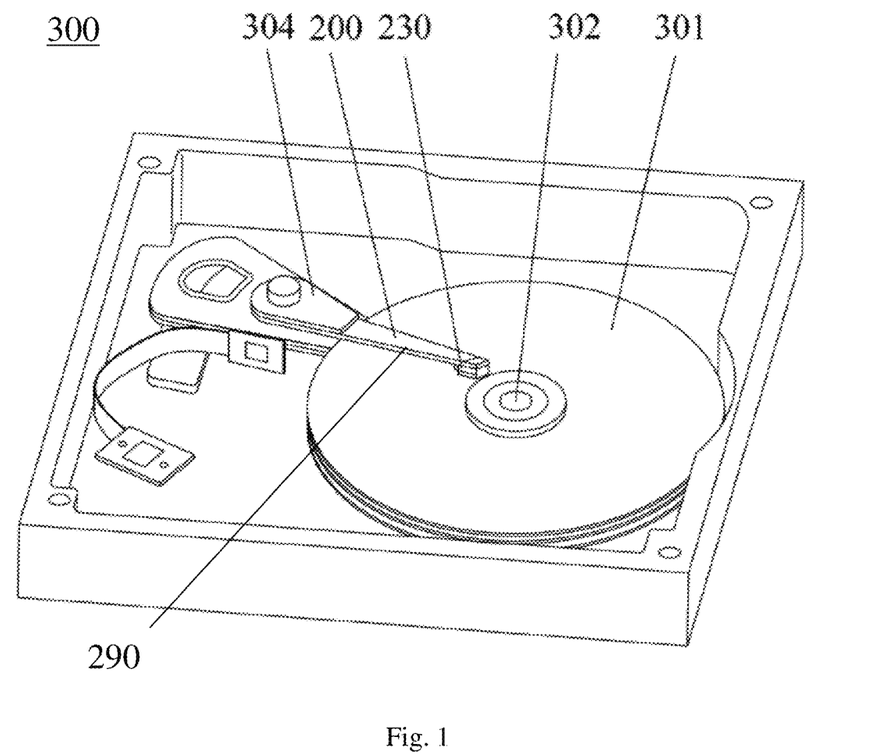
FIG. 1 is a structural schematic view of a hard disk drive in related art.

The hard disk drive (HDD) is used for writing/reading data to/from a disk. As shown in FIG. 1, a hard disk drive 300 generally comprises a plurality of rotatable disks 301 connected to a spindle motor 302, a drive arm 304, and a head gimbal assembly (HGA) 200 mounted at an end of the drive arm 304. Typically, the hard disk drive 300 may further include a voice-coil motor (VCM) to control the movement of the driving arm 304. The head gimbal assembly 200 comprises a magnetic head 230 and a suspension 290 for supporting the magnetic head 230. When the hard disk drive 300 works, the disk 301 is rotated at a high speed by the spindle motor 302, and the magnetic head 230 flies above the disk due to the air pressure generated by the rotation of the disk 301. Under the control of the voice-coil motor, the magnetic head 230 moves in a radial direction on the surface of the disk 301. Concerning different tracks, the magnetic head 230 can read/write data from/to the disk 301.

Figure 2:
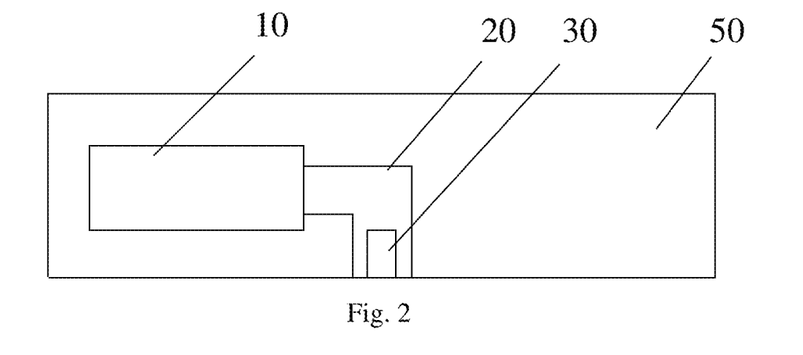
FIG. 2 is a structural schematic view of an LIT structure in related art.

According to the technology of heat assisted magnetic recording (HAMR), the magnetic head comprises a slider and a light source unit (such as a laser diode) arranged on the slider. The light source unit provides energy to a part of the magnetic recording medium so as to reduce the coercive force the part. Furthermore, a write magnetic field can be applied to the part that is heated, to facilitate the write operation. Please referring to FIG. 2, for example, the light source unit 10 may be a laser diode, and in the LIT (LD In Trailing surface) structure, the trailing surface of the slider 50 may be provided with a cavity, in which the laser diode is placed. The laser emitted from the laser diode can be transmitted by the waveguide 20 and transduced into the near-field light by the surface plasmon antenna 30, so as to heat the magnetic recording medium and reduce the coercive force of the magnetic recording medium to facilitate data writing on the magnetic recording medium by the magnetic head.

Figure 3:
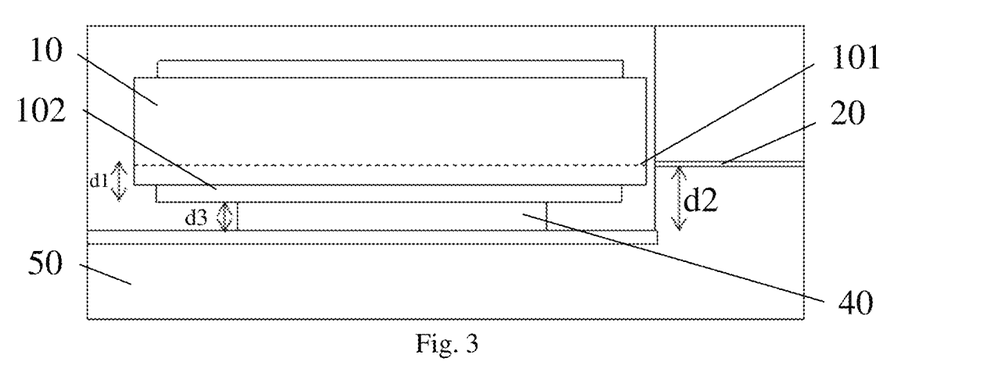
FIG. 3 is a view illustrating a position relationship between a light source unit and a waveguide in related art.

Please referring to FIG. 3, concerning the above LIT structure, in order to ensure the optical alignment between the emission opening 101 of the light source unit and the waveguide 20, the following mechanical dimensions may be adjusted: (1) the distance d1 between the emission opening 101 of the light source unit and the electrical connecting layer 102 of the light source unit; (2) the distance d2 between the bottom surface of the cavity 60 of the slider 50 and the waveguide 20; (3) the thickness d3 of the welding layer 40 between the light source unit 10 and the slider 50. In practical application, the abovementioned dimensions (1) and (2) can be precisely controlled. However, during use, as the thickness d3 of the welding layer in the dimension (3) changes due to the melting, it is difficult to control the thickness of the welding layer between the light source unit and the slider which are joined. Hence, it is difficult to achieve precise optical alignment between the light source unit and the waveguide, and thus it is difficult to ensure the optical coupling efficiency between the light source unit and the waveguide.

SUMMARY

Aiming at the shortcomings of existing technologies, the embodiment of the disclosure provides a light source unit, which is applied to a thermally assisted magnetic head. The thermally assisted magnetic head comprises a slider, and the slider is provided with a waveguide and with a first cavity for accommodating the light source unit; A welding layer and a stopping structure are provided between the light source unit and the slider; The light source unit is configured to move as the welding layer melts and can be limited at a preset position by the stopping structure, when joined with the slider. At the preset position, an emission opening of the light source unit aligns with the waveguide.

Preferably, the slider may comprise a slider body and a conductive layer, wherein the conductive layer may be connected to the slider body and the conductive layer may be provided for connecting with the welding layer; The light source unit may comprise a light source body and a first electrical connecting layer, the first electrical connecting layer may be connected with the light source body, and the welding layer may be configured to be provided on the first electrical connecting layer or the conductive layer.

Preferably, the stopping structure may comprise at least one stop. The stop may be configured to be provided on the light source unit, and the stop may move to abut against the slider as the welding layer melts when the light source unit is joined with the slider, alternatively, The stop may be configured to be provided on the slider, and the stop may move to abut against the light source unit as the welding layer melts when the light source unit is joined with the slider.

Preferably, a first surface of the stop may be connected to the light source body, a second surface of the stop may abut against the slider body or the conductive layer when the light source unit is joined with the slider, and the first surface of the stop may be arranged opposite to the second surface of the stop.

Preferably, a number of the stops may be at least two. The at least two stops may define an interval space therebetween, and the first electrical connecting layer may be at least partially accommodated in the interval space;

In the case that the welding layer is provided on the first electrical connecting layer, the welding layer may protrude further than the second surface of the stop. When the light source unit is joined with the slider, the second surface of the stop may move to abut against the conductive layer as the welding layer melts, thereby limiting the light source unit at the preset position; alternatively, In the case that the welding layer is provided on the first electrical connecting layer, the welding layer may protrude further than the second surface of the stop, or, the second surface of the stop may protrude further than the welding layer. When the light source unit is joined with the slider, the second surface of the stop may move to abut against the slider body as the welding layer melts, thereby limiting the light source unit at the preset position; alternatively, In the case that the welding layer is provided on the conductive layer, the second surface of the stop may move to abut against the conductive layer or the slider body as the welding layer melts when the light source unit is joined with the slider, thereby limiting the light source unit at the preset position.

Preferably, the at least two stops may be arranged to define an interval space, and the at least two stops may extend along a length direction or a width direction of the light source body.

Preferably, the stop may extend along a length direction of the light source body, and a length of the stop is less than a length of the light source unit.

Preferably, the light source unit may be a laser diode, and the light source body may comprise a substrate, the light source body may be formed by a deposition on the substrate, the stop may be formed in a deposition process of the light source body, and a material of the stop may be the same as a material of the light source body.

Preferably, both the stop and the light source body may be made of GaAs.

Preferably, the light source unit may be a laser diode, and the light source body may comprise a substrate, the light source body may be formed by a deposition on the substrate, the stop may be formed after a deposition process of the light source body, and a material of the stop may be different from a material of the light source body.

Preferably, the stop may be made of a dielectric material.

Preferably, the stop may be formed in a wafer process of the slider.

Preferably, the stop may have a length less than a length of the light source unit.

Preferably, the stopping structure may comprise a second cavity and the first cavity, the second cavity may be provided in the slider body, and the second cavity may be in communication with the first cavity, to form a double-cavity structure with a step; the conductive layer may be connected to the slider body and accommodated in the second cavity; when the light source unit is joined with the slider, the light source body or the first electrical connecting layer move to abut against the step as the welding layer melts, thereby limiting the light source unit at the preset position.

In order to solve same technical problems, an embodiment of the disclosure further provides a thermally assisted magnetic head, which comprises the slider and the light source unit, and the light source unit is joined with the slider.

In order to solve same technical problems, an embodiment of the disclosure further provides a head gimbal assembly, which comprises the thermally assisted magnetic head.

In order to solve same technical problems, an embodiment of the disclosure further provides a hard disk drive, which comprises the head gimbal assembly.

Compared with existing technologies, the embodiment of the disclosure has advantages as follows. The embodiment of the disclosure provides the light source unit which can be applied to the thermally assisted magnetic head, and the welding layer and the stopping structure are disposed between the slider of the thermally assisted magnetic head and the light source unit. The light source unit moves as the welding layer melts and can be precisely limited at the preset position by the stopping structure, when joined with the slider. Consequently, the emission opening of the light source unit and the waveguide can be aligned precisely, thereby increasing the optical coupling efficiency between the light source unit and the waveguide. Meanwhile, the embodiments of the disclosure further provide the thermally assisted magnetic head, the head gimbal assembly, and the hard disk drive, accordingly.

DETAILED DESCRIPTION OF ILLUSTRATED EMBODIMENTS

The technical solutions according to the embodiments of the present disclosure will be clearly and completely explained below in conjunction with the drawings for the embodiments. Apparently, the described embodiments are merely a part rather than all of the embodiments of the present disclosure. All embodiments obtained by those skilled in the art based on the embodiments of the present disclosure without creative work shall fall within the scope of the present disclosure.

Figure 4:
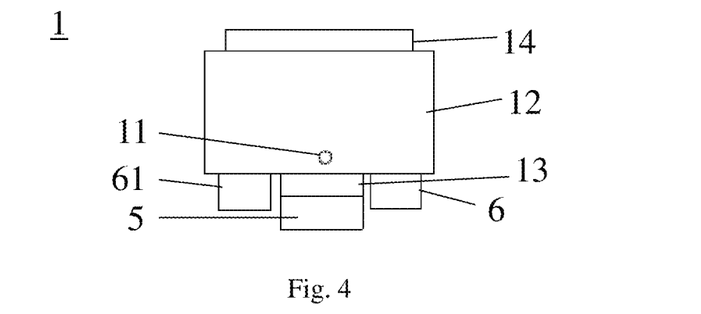
FIG. 4 is a structural schematic view of a light source unit according to an embodiment of the disclosure.
Figure 5:
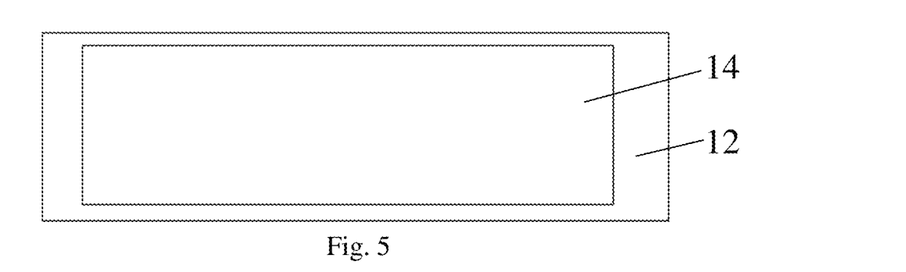
FIG. 5 is a top view of a light source unit according to an embodiment of the disclosure.
Figure 6:
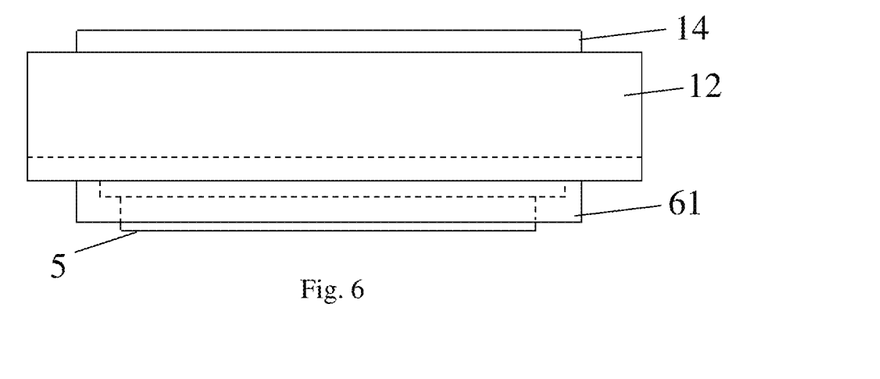
FIG. 6 is a side view of a light source unit according to an embodiment of the disclosure.
Figure 7:
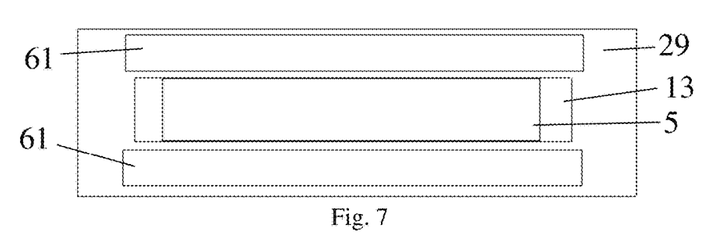
FIG. 7 is a bottom view of a light source unit according to an embodiment of the disclosure.

Please refer to FIG. 4, which is a structural schematic view of a light source unit according to an embodiment of the disclosure.

In the embodiment of the disclosure, the light source unit 1 is applied to a thermally assisted magnetic head. The thermally assisted magnetic head comprises a slider 2, and the slider 2 is provided with a waveguide 3 and with a first cavity 4 for accommodating the light source unit 1. A welding layer 5 and a stopping structure 6 are provided between the light source unit 1 and the slider 2. The light source unit 1 is configured to move as the welding layer 5 melts and can be limited at a preset position by the stopping structure 6, when joined with the slider 2. At the preset position, an emission opening 11 of the light source unit 1 aligns with the waveguide 3.

In the embodiment of the disclosure, the welding layer 5 and the stopping structure 6 are disposed between the slider 2 of the thermally assisted magnetic head and the light source unit 1. Thus, when the light source unit 1 is joined with the slider 2, the light source unit 1 moves as the welding layer 5 melts and can be precisely limited at the preset position by the stopping structure 6. In such a case, the emission opening 11 of the light source unit 1 and the waveguide 3 can be aligned precisely, thereby increasing the optical coupling efficiency between the light source unit 1 and the waveguide 3.

Please referring to FIGS. 4-7, in a particular implementation, the light source unit 1 comprises a light source body 12 and a first electrical connecting layer 13, and the first electrical connecting layer 13 is connected with a first surface of the light source body 12. In a particular implementation, the light source unit 1 may further comprise a second electrical connecting layer 14, the second electrical connecting layer 14 may be connected with a second surface of the light source body 12, and the first surface of the light source body 12 may be arranged opposite to the second surface of the light source body 12. Illustratively, the light source unit 1 may be a laser diode (LD). The first electrical connecting layer 13 of the light source unit 1 may serve as the N connecting electrode of the laser diode, and the second electrical connecting layer 14 of the light source unit 1 may serve as the P connecting electrode of the laser diode. Alternatively, the first electrical connecting layer 13 of the light source unit 1 may serve as the P connecting electrode of the laser diode, and the second electrical connecting layer 14 of the light source unit 1 may serve as the N connecting electrode of the laser diode. In practical application, the light source unit 1 may be controlled to operate depending on the power supply to the first electrical connecting layer 13 and the second electrical connecting layer 14 of the light source unit 1. The HAMR structure in the present embodiment is LIT structure, i.e., a structure in which the laser diode is placed in the trailing surface of the slider 2.

Figure 8:
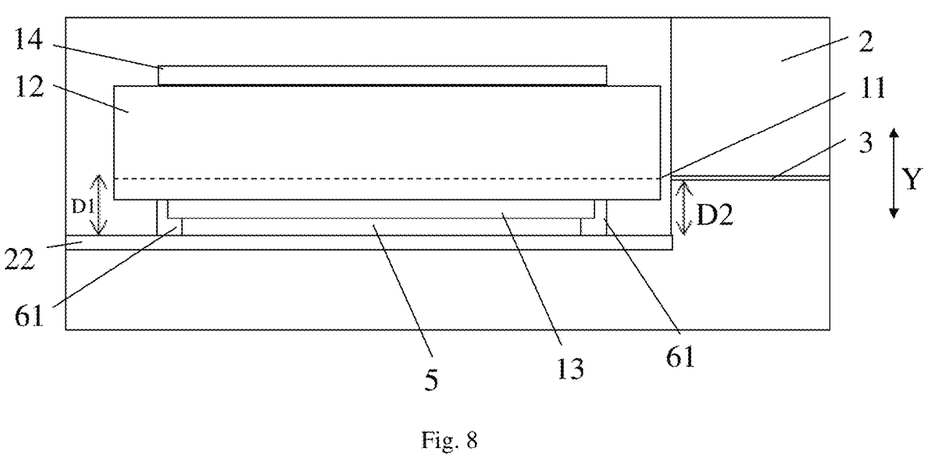
FIG. 8 is a schematic view illustrating a light source unit and a slider which are joined according to an embodiment of the disclosure.

Please referring to FIG. 8, in a particular implementation, the slider 2 may comprise a slider body 21 and a conductive layer 22, wherein the conductive layer 22 may be connected to the slider body 21 and the conductive layer 22 may be provided for connecting with the welding layer 5. In practical application, when the light source unit 1 is joined with the slider 2, the conductive layer 22 and the first electrical connecting layer 13 respectively come into contact with the welding layer 5, and melt the welding layer 5 by heating (for example, heating the slider 2 such that the welding layer 5 can be melt due to the heat energy transferred to the welding layer 5), thereby enabling the light source unit 1 to join with the slider 2. In particular, the first electrical connecting layer 13 of the light source unit 1 may be connected to an external control circuit through the welding layer 5 and the conductive layer 22, and the second electrical connecting layer 14 of the light source unit 1 may be connected to an external control circuit, such that the light source unit 1 can be controlled by the external control circuit. Illustratively, the conductive layer 22 for example may be a gold layer. Apparently, the conductive layer 22 may use other conductive materials according to actual use requirements and details will not be repeated here.

Please referring to FIGS. 9-13, in an optional example, the stopping structure 6 may comprise at least one stop 61. The stop 61 may be configured to be provided on the light source unit 1, and the stop 61 may move to abut against the slider 2 as the welding layer 5 melts when the light source unit 1 is joined with the slider 2. Alternatively, the stop 61 may be configured to be provided on the slider 2, and the stop 61 may move to abut against the light source unit 1 as the welding layer 5 melts when the light source unit 1 is joined with the slider 2.

In a particular implementation, the stop 61 may be positioned in two ways. In the first way, before the light source unit 1 is joined with the slider 2, the stop 61 may be provided on the light source unit 1. When the light source unit 1 is joined with the slider 2, the welding layer 5 is heated and melts. At that time, as the welding layer 5 melts, the stop 61 moves along with the light source unit 1 and stops when the stop 61 comes into contact with the slider 2. By this time, the light source unit 1 arrives at the preset position. In the second way, before the light source unit 1 is joined with the slider 2, the stop 61 is provided on the slider 2. When the light source unit 1 is joined with the slider 2, the welding layer 5 is heated and melts. At that time, the stop 61 and the light source unit 1 simultaneously move as the welding layer 5 melts and stop when the stop 61 comes into contact with the light source unit 1. By this time, the light source unit 1 arrives at the preset position. Consequently, in the present embodiment, the emission opening 11 of the light source unit 1 and the waveguide 3 can be aligned precisely, thereby increasing the optical coupling efficiency between the light source unit 1 and the waveguide 3.

In an optional example, the first surface of the stop 61 may be connected to the light source body 12, the second surface of the stop 61 may abut against the slider body 21 or the conductive layer 22 when the light source unit 1 is joined with the slider 2, and the first surface of the stop 61 may be arranged opposite to the second surface of the stop 61.

In the present embodiment, the stopping structure 6 comprises at least one stop 61 provided on the light source body 12. When the light source unit 1 is joined with the slider 2, the welding layer 5 is heated and melts, and both the stop 61 and the light source unit 1 simultaneously move towards the slider 2. Once the stop 61 comes into contact with the slider body 21 or the conductive layer 22, the stop 61 and the light source unit 1 stop moving, thereby ensuring that the light source unit 1 is stopped at the preset position.

In a particular implementation, the first surface of the stop 61 may be connected to the light source body 12, and the welding layer 5 may be provided on the first electrical connecting layer 13 or the conductive layer 22. Illustratively, a number of the stops 61 may be at least two. The at least two stops 61 may define an interval space therebetween, and the first electrical connecting layer 13 may be at least partially accommodated in the interval space. It should be explained that, in order to facilitate the accommodation of the solder of the melted welding layer 5, the welding layer 5 may be designed with a length less than that of the stop 61; alternatively, a certain gap may be provided between the first electrical connecting layer 13 and the stop 61; alternatively, a certain gap may be provided between the welding layer 5 and the stop 61; alternatively, a certain gap may be provided between the conductive layer 22 and the stop 61. Illustratively, referring to FIGS. 9-13, 5 ways of assembling the light source unit 1 and the slider 2 are listed below.

Figure 9:
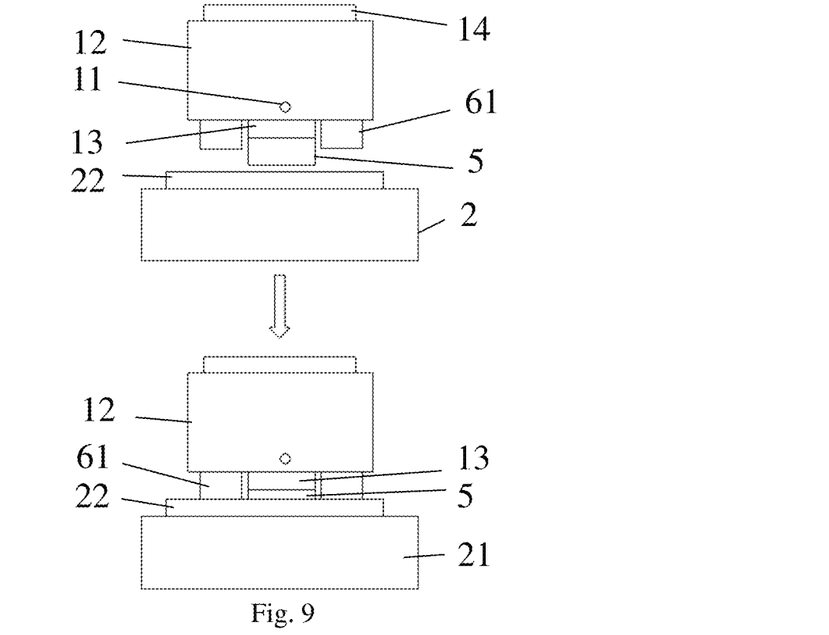
FIG. 9 is a schematic view illustrating a first way to assemble a light source unit and a slider according to an embodiment of the disclosure.

Please refer to FIG. 9, which is a schematic view illustrating a first way to assemble the light source unit 1 and the slider 2 according to the embodiment of the disclosure. In the case that the welding layer 5 is provided on the first electrical connecting layer 13, the welding layer 5 may protrude further than the second surface of the stop 61. When the light source unit 1 is joined with the slider 2, the second surface of the stop 61 may move to abut against the conductive layer 22 as the welding layer 5 melts, whereby the light source unit 1 can be limited at the preset position.

In the present embodiment, before the light source unit 1 is joined with the slider 2, the welding layer 5 is provided on the first electrical connecting layer 13, and the welding layer 5 protrudes further than the second surface of the stop 61. Thus, when the light source unit 1 is joined with the slider 2, the welding layer 5 may be brought into contact with the conductive layer 22, and the welding layer 5 may be heated to melt. As the welding layer 5 melts, the stop 61 and the light source unit 1 move simultaneously. At last, the stop 61 may abut against the conductive layer 22. At this moment, the light source unit 1 is stopped at the preset position, and the welding layer 5 is accommodated in the interval space.

Figure 10:
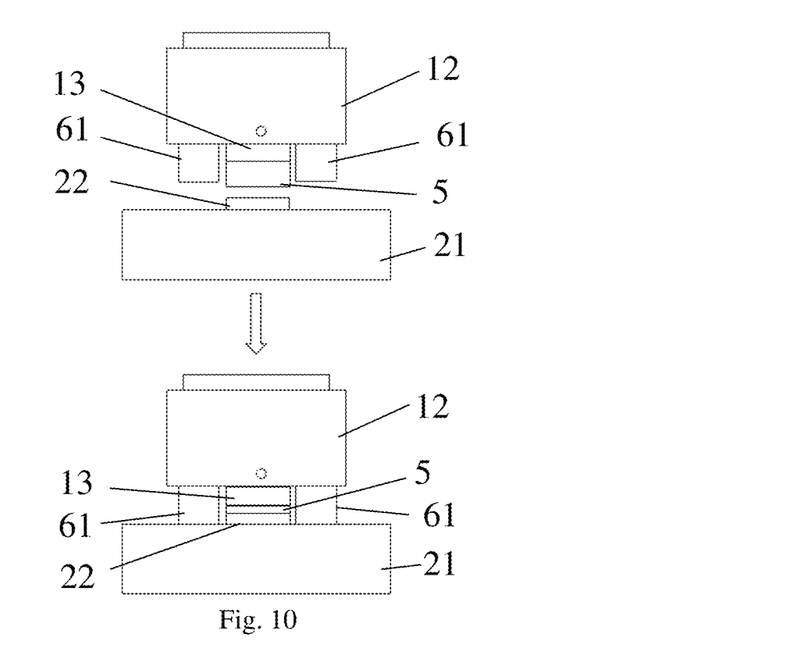
FIG. 10 is a schematic view illustrating a second way to assemble a light source unit and a slider according to an embodiment of the disclosure.

Please refer to FIG. 10, which is a schematic view illustrating a second way to assemble the light source unit 1 and the slider 2 according to the embodiment of the disclosure. In the case that the welding layer 5 is provided on the first electrical connecting layer 13, the welding layer 5 may protrude further than the second surface of the stop 61. When the light source unit 1 is joined with the slider 2, the second surface of the stop 61 may move to abut against the slider body 21 as the welding layer 5 melts, whereby the light source unit 1 can be limited at the preset position.

In the present embodiment, before the light source unit 1 is joined with the slider 2, the welding layer 5 is provided on the first electrical connecting layer 13, and the welding layer 5 protrudes further than the second surface of the stop 61. When the light source unit 1 is joined with the slider 2, the welding layer 5 may be brought into contact with the conductive layer 22, and the welding layer 5 may be heated to melt. As the welding layer 5 melts, the stop 61 and the light source unit 1 move simultaneously. At last, the stop 61 may abut against the slider body 21. At this moment, the light source unit 1 is stopped at the preset position, and the welding layer 5 and the conductive layer 22 are accommodated in the interval space.

Figure 11:
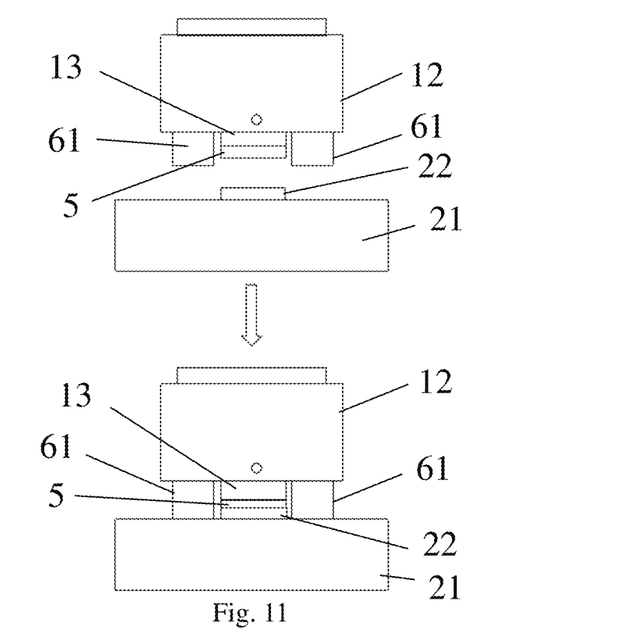
FIG. 11 is a schematic view illustrating a third way to assemble a light source unit and a slider according to an embodiment of the disclosure.

Please refer to FIG. 11, which is a schematic view illustrating a third way to assemble the light source unit 1 and the slider 2 according to the embodiment of the disclosure. In the case that the welding layer 5 is provided on the first electrical connecting layer 13, the second surface of the stop 61 may protrude further than the welding layer 5. When the light source unit 1 is joined with the slider 2, the second surface of the stop 61 may move to abut against the slider body 21 as the welding layer 5 melts, whereby the light source unit 1 can be limited at the preset position.

In the present embodiment, before the light source unit 1 is joined with the slider 2, the welding layer 5 is provided on the first electrical connecting layer 13, and the second surface of the stop 61 protrudes further than the welding layer 5. When the light source unit 1 is joined with the slider 2, the welding layer 5 may be brought into contact with the conductive layer 22, and the welding layer 5 may be heated to melt. As the welding layer 5 melts, the stop 61 and the light source unit 1 move simultaneously. At last, the stop 61 may abut against the slider body 21. At this moment, the light source unit 1 is stopped at the preset position, and the welding layer 5 and the conductive layer 22 are accommodated in the interval space.

Figure 12:
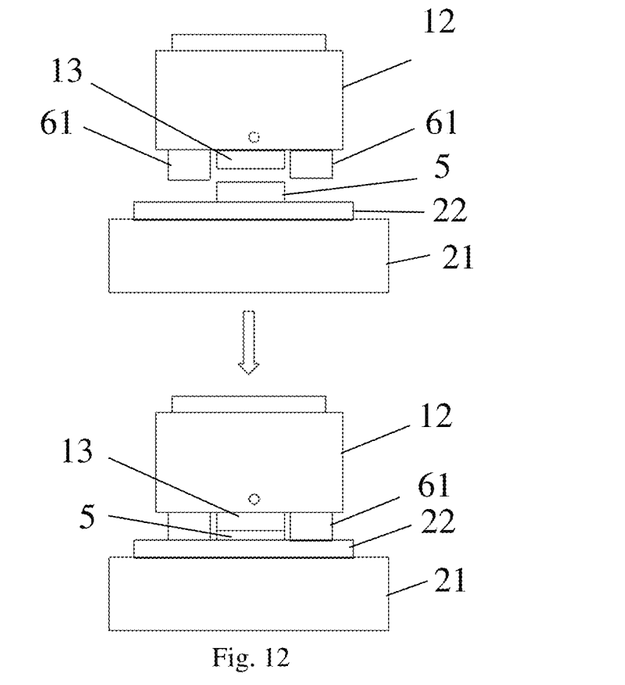
FIG. 12 is a schematic view illustrating a fourth way to assemble a light source unit and a slider according to an embodiment of the disclosure.

Please refer to FIG. 12, which is a schematic view illustrating a fourth way to assemble the light source unit 1 and the slider 2 according to the embodiment of the disclosure. In the case that the welding layer 5 is provided on the conductive layer 22, the second surface of the stop 61 may move to abut against the conductive layer 22 as the welding layer 5 melts when the light source unit 1 is joined with the slider 2, whereby the light source unit 1 can be limited at the preset position.

In the present embodiment, before the light source unit 1 is joined with the slider 2, the welding layer 5 is provided on the conductive layer 22. When the light source unit 1 is joined with the slider 2, the welding layer 5 may be brought into contact with the first electrical connecting layer 13, and the welding layer 5 may be heated to melt. As the welding layer 5 melts, the stop 61 and the light source unit 1 move simultaneously. At last, the stop 61 may abut against the conductive layer 22. At this moment, the light source unit 1 is stopped at the preset position, and the welding layer 5 is accommodated in the interval space.

Figure 13:
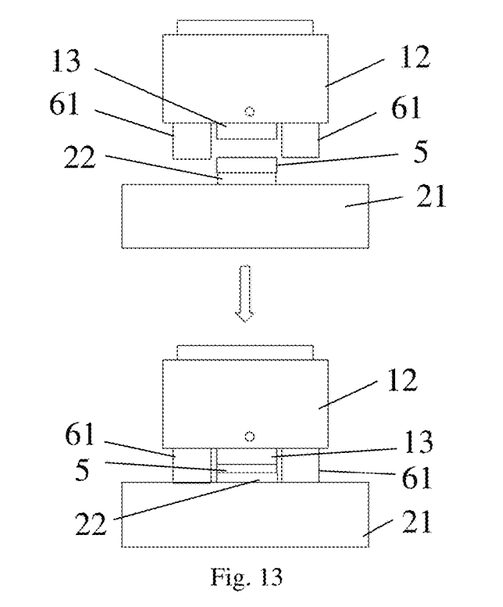
FIG. 13 is a schematic view illustrating a fifth way to assemble a light source unit and a slider according to an embodiment of the disclosure.

Please refer to FIG. 13, which is a schematic view illustrating a fifth way to assemble the light source unit 1 and the slider 2 according to the embodiment of the disclosure. In the case that the welding layer 5 is provided on the conductive layer 22, the second surface of the stop 61 may move to abut against the slider body 21 as the welding layer 5 melts when the light source unit 1 is joined with the slider 2, whereby the light source unit 1 can be limited at the preset position.

In the present embodiment, before the light source unit 1 is joined with the slider 2, the welding layer 5 is provided on the conductive layer 22. When the light source unit 1 is joined with the slider 2, the welding layer 5 may be brought into contact with the first electrical connecting layer 13, and the welding layer 5 may be heated to melt. As the welding layer 5 melts, the stop 61 and the light source unit 1 move simultaneously. At last, the stop 61 may abut against the conductive layer 22. At this moment, the light source unit 1 is stopped at the preset position, and the welding layer 5 and the conductive layer 22 are accommodated in the interval space.

Please referring to FIGS. 4-8 and 14, in an optional example, the at least two stops 61 are arranged to define an interval space, and the at least two stops 61 extend along the length direction or width direction of the light source body 12.

Illustratively, please referring to FIGS. 4-8, a number of the stops 61 in the present embodiment may be two. The two stops 61 may have a cuboid structure. The two stops 61 may be arranged to define an interval space and extend along the length direction of the light source body 12 in such a manner that the stops 61 can be reliably stopped at the slider 2.

Figure 14:
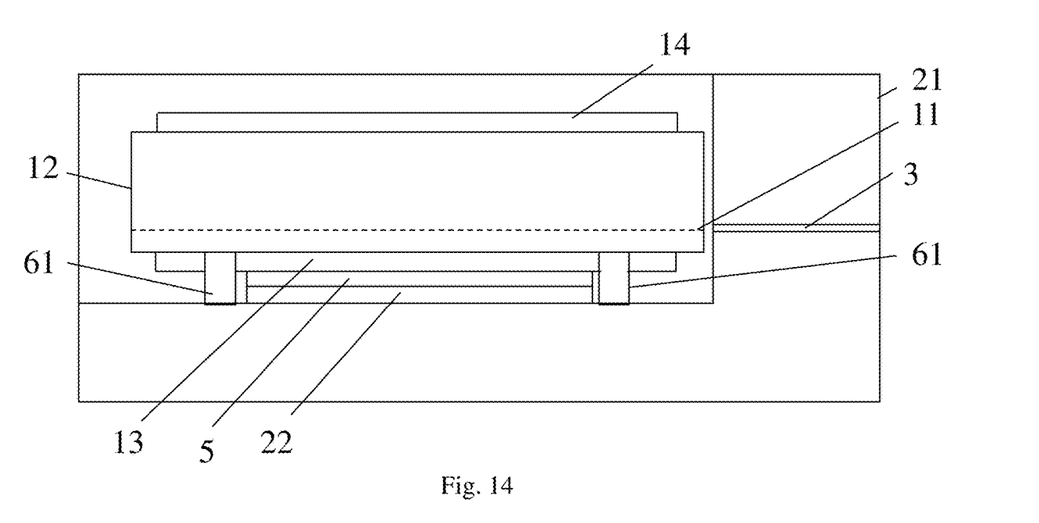
FIG. 14 is a schematic view illustrating a light source unit and a slider which are joined according to an embodiment of the disclosure.

Illustratively, please referring to FIG. 14, a number of the stops 61 in the present embodiment may be two. The two stops 61 may be arranged to define an interval space and extend along the width direction of the light source body 12, thereby allowing the stops 61 to be reliably stopped at the slider 2.

In a particular implementation, the at least two stops 61 may be arranged substantially in parallel, thereby further allowing the stops 61 to be reliably stopped at the slider 2. In addition, the two stops 61 may have a cuboid structure, or U-shaped structure, or L-shaped structure, or other structures. Apparently, the stops 61 may be designed to have other shapes according to actual use requirements and details will not be repeated here. Preferably, the second surface of the stop 61 may be a flat surface, to further ensure that the stops 61 can be reliably stopped at the slider 2.

Figure 16:
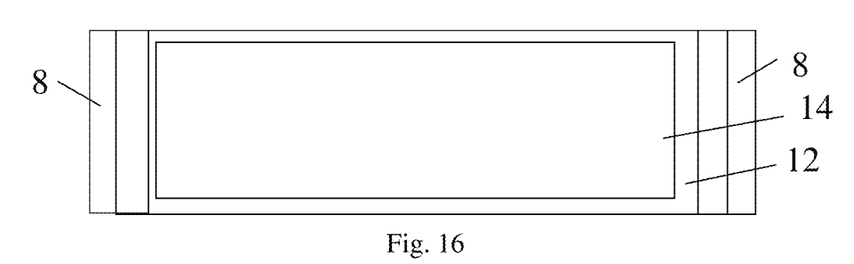
FIG. 16 is a top view of a light source unit with an end coating according to an embodiment of the disclosure.
Figure 17:
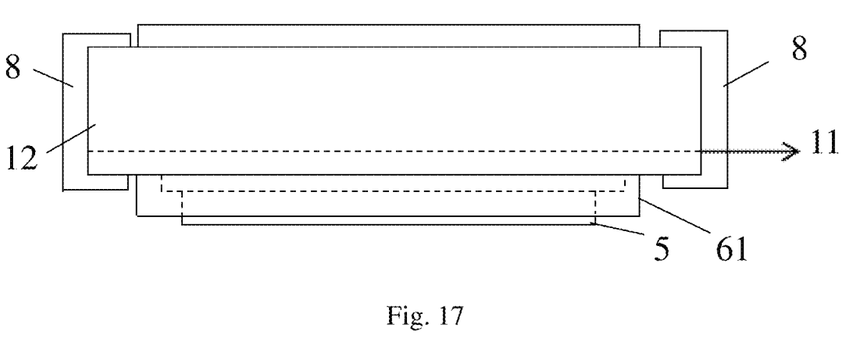
FIG. 17 is a side view of a light source unit with an end coating according to an embodiment of the disclosure.
Figure 18:
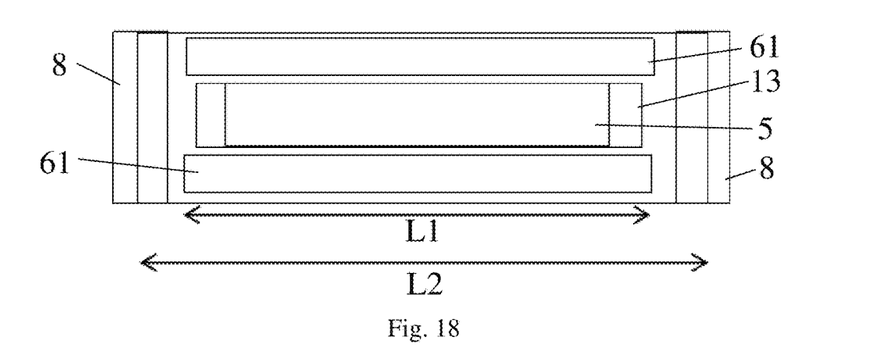
FIG. 18 is a bottom view of a light source unit with an end coating according to an embodiment of the disclosure.

Please referring to FIGS. 16-18, in an optional example, the stop 61 may extend along the length direction of the light source unit 1, and the length L1 of the stop 61 is less than the length L2 of the light source unit 1. In a particular implementation, the light source unit 1 may be further provided with an end coating 8. In order to avoid the overlapping of the end coating 8 and the stop 61 which may result in falling off of the end coating 8, the stop 61 in the present embodiment may have a length less than the length of the light source unit 1.

In an optional example, the light source unit 1 may be a laser diode, and the light source body 12 may comprise a substrate 7. The light source body 12 may be formed by a deposition process on the substrate 7, the stop 61 may be formed in the deposition process of the light source body 12, and the material of the stop 61 may be the same as the material of the light source body 12. Illustratively, both the stop 61 and the light source body 12 may be made of GaAs.

Figure 15:
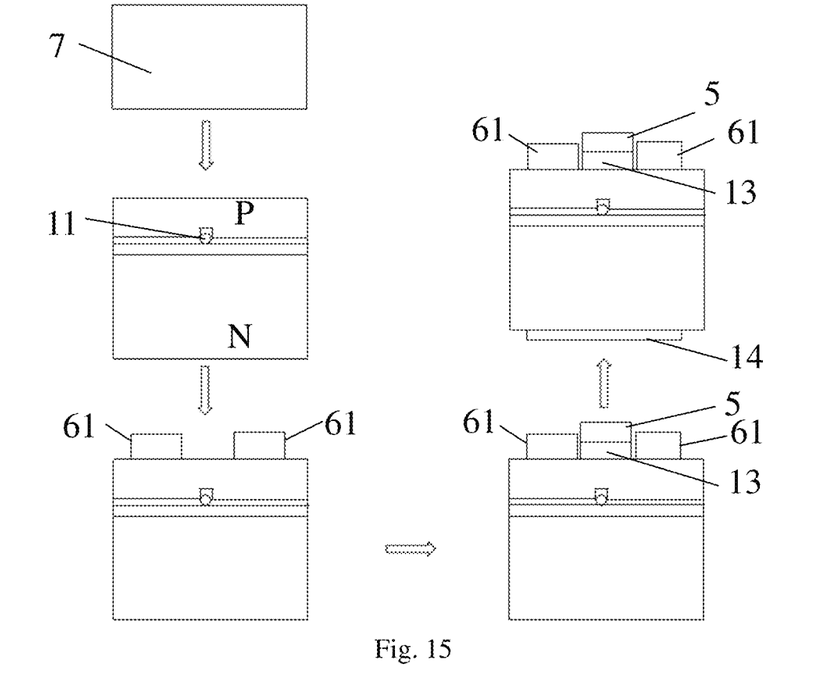
FIG. 15 is a flow chart illustrating a preparation method for a light source unit according to an embodiment of the disclosure.

Please referring to FIG. 15, in a particular implementation, in order to form the stop 61, firstly conducting PN-layer deposition on the GaAs substrate 7. Then, using GaAs material to deposit the stop 61 (for example, forming a step structure). Then, preparing the first electrical connecting layer 13 and the welding layer 5. Finally, conducting backside grind for the laser diode, and preparing the second electrical connecting layer 14. For example, the first electrical connecting layer 13 and the second electrical connecting layer 14 may be gold layers.

In practical application, the PN-layer deposition process of the laser diode usually uses the Metal-organic Chemical Vapor Deposition (MO-CVD) method or the Molecular beam epitaxy (MBE) method. These methods can achieve a precise control of the deposition thickness. Hence, as the stop 61 in the present embodiment is formed in the deposition process of the light source body 12, the thickness of the stop 61 can be precisely controlled, thereby ensuring that the light source unit 1 can be precisely limited at the preset position by the stop 61 when the light source unit 1 is joined with the slider 2. Thus, a precise alignment between the emission opening 11 of the light source unit 1 and the waveguide 3 can be ensured, thereby increasing the optical coupling efficiency between the light source unit 1 and the waveguide 3.

In an optional example, the light source unit 1 may be a laser diode, the light source body 12 may comprise a substrate 7, the light source body 12 may be formed by a deposition process on the substrate 7, the stop 61 may be formed after the deposition process of the light source body 12, the material of the stop 61 may be different from the material of the light source body 12. The stop 61 may be made of a dielectric material. Illustratively, the stop 61 may be made of at least one of $SiO_2$, SiN, and AlO.

It should be noted that the stop 61 may be provided on the slider 2, and the stop 61 may be formed in the wafer process of the slider 2. The stop 61 may be made of a dielectric material. Illustratively, the stop 61 may be made of at least one of $SiO_2$, SiN, and AlO.

In a particular implementation, it is generally required that the accuracy of the optical alignment of the light source unit 1 and the waveguide 3 in the Y direction is at a level less than +/−0.45 μm. Please referring to FIG. 8, the structure of the light source unit 1 in the embodiment of the disclosure uses the deposition process, ensuring that the accuracy 30 of the distance D1 between the second surface (i.e., the joint surface of the light source unit 1) of the stop 61 and the emission opening 11 of the light source unit 1 is 0.3 μm. In the structure of the slider 2, the accuracy 30 of the distance D2 between the bottom surface (i.e., the joint surface of the slider 2) of the first cavity 4 and the waveguide 3 is 0.3 μm. After the welding layer 5 is melted, the stop 61 comes into contact with the slider 2, and the thickness of the welding layer 5 that is welded can be accurately maintained at a same size. In overall, $3\sigma=\sqrt{0.3^2+0.3^2}$, approximately 0.42, and thus meets the required accuracy +/−0.45 μm.

Figure 19:
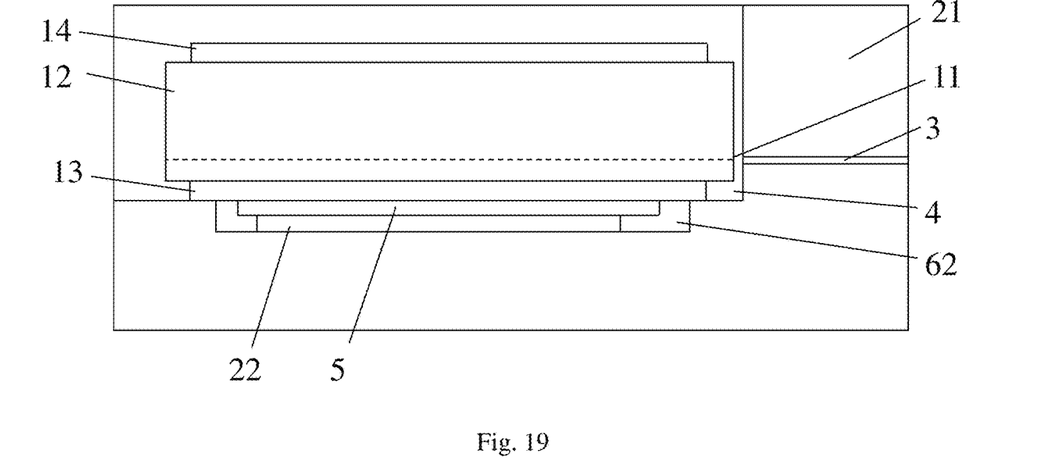
FIG. 19 is a schematic view illustrating a light source unit and a slider with a second cavity are assembled according to an embodiment of the disclosure Herein: 300. hard disk drive; 302. spindle motor; 301. disk; 304. drive arm; 200. head gimbal assembly; 230. magnetic head; 290. suspension; 10. light source unit; 101. emission opening of light source unit; 102. electrical connecting layer of light source unit; 20. waveguide; 30. surface plasmon antenna; 40. welding layer; 50. slider; 60. cavity; 1. light source unit; 11. emission opening of light source unit; 12. light source body; 13. first electrical connecting layer; 14. second electrical connecting layer; 2. slider; 21. slider body; 22. conductive layer; 3. waveguide; 4. first cavity; 5. welding layer; 6. stopping structure; 61. stop; 62. second cavity; 7. substrate; 8. end coating.

Please referring to FIG. 19, in a further optional example, the stopping structure 6 may comprise a second cavity 62 and the first cavity 4, the second cavity 62 is provided in the slider body 21, and the second cavity 62 is in communication with the first cavity 4, to form a double-cavity structure with a step. The conductive layer 22 is connected to the slider body 21 and is accommodated in the second cavity 62. When the light source unit 1 is joined with the slider 2, the light source body 12 or the first electrical connecting layer 13 move to abut against the step as the welding layer 5 melts, thereby limiting the light source unit 1 at the preset position.

In the present embodiment, as the second cavity 62 in communication with the first cavity 4 is provided in the slider 2, the double-cavity structure can be formed. The double-cavity structure has a step, and the conductive layer 22 is accommodated in the second cavity 62. Consequently, when the light source unit 1 is joined with the slider 2, the welding layer 5 which sandwiched between the first electrical connecting layer 13 and the conductive layer 22 can be heated to melt. The light source unit 1 may move as the welding layer 5 melts and finally stop when it comes into contact with the slider body 21, in particular stop at the step of the double-cavity structure. At this moment, the light source unit 1 is stepped at the preset position, and the welding layer 5 and the conductive layer 22 are accommodated in the second cavity 62. It should be explained that, in order to facilitate the accommodation of the solder of the melted welding layer 5, a certain gap may be provided between the welding layer 5 and the second cavity 62; alternatively, a certain gap may be provided between the conductive layer 22 and the second cavity 62.

In the present embodiment, before the light source unit 1 is joined with the slider 2, the welding layer 5 may be provided on the first electrical connecting layer 13 or the conductive layer 22. In particular, in the case that the welding layer 5 is provided on the first electrical connecting layer 13 before the light source unit 1 is joined with the slider 2, the welding layer 5 may be brought into contact with the conductive layer 22 and heated to melt when the light source unit 1 is joined with the slider 2. The light source unit 1 may move as the welding layer 5 melts, and finally stop when the first electrical connecting layer 13 or the light source body 12 comes into contact with the slider body 21. At this moment, the light source unit 1 is stopped at the preset position, and the welding layer 5 and the conductive layer 22 are accommodated in the second cavity 62. Herein, in the case that the size of the first electrical connecting layer 13 is less than the second cavity 62, the light source body 12 can come into contact with the slider body 21 and be stopped (not shown in the drawings). In the case that the size of the first electrical connecting layer 13 is greater than the second cavity 62, the first electrical connecting layer 13 can come into contact with the slider body 21 and be stopped (as shown in FIG. 19).

Accordingly, an embodiment of the disclosure further provides a thermally assisted magnetic head 230, which comprises the slider 2 and the light source unit 1, and the light source unit 1 is joined with the slider 2.

Accordingly, an embodiment of the disclosure further provides a head gimbal assembly 200, which comprises the thermally assisted magnetic head 230.

Accordingly, an embodiment of the disclosure further provides a head gimbal assembly 200. Please referring to FIG. 1, the head gimbal assembly 200 comprises the thermally assisted magnetic head.

Accordingly, referring to FIG. 1, a hard disk drive 300 is further provided in an embodiment of the disclosure, which comprises the head gimbal assembly 200. In a particular implementation, the hard disk drive 300 may further comprise a plurality of rotatable disks 301 connected with the spindle motor 302 and a drive arm 304, and the head gimbal assembly 200 is mounted at an end of the drive arm 304. Generally, the hard disk drive 300 may further comprise a voice-coil motor for control the movement of the drive arm 304. When the hard disk drive 300 works, the disks 301 are rotated at a high speed by the spindle motor 302, and the magnetic head flies above the disks due to the air pressure generated by the rotation of the disks 301. Under the control of the voice-coil motor, the magnetic head moves in a radial direction on the surface of the disks 301. Concerning different tracks, the magnetic head can read/write data from/to the disks 301.

Compared with existing technologies, the embodiment of the disclosure has advantages as follows. The embodiment of the disclosure provides the light source unit 1 which can be applied to the thermally assisted magnetic head, and the welding layer 5 and the stopping structure 6 are disposed between the slider 2 of the thermally assisted magnetic head and the light source unit 1. The light source unit 1 moves as the welding layer 5 melts and can be precisely limited at the preset position by the stopping structure 6, when joined with the slider 2. Consequently, the emission opening 11 of the light source unit 1 and the waveguide 3 can be aligned precisely, thereby increasing the optical coupling efficiency between the light source unit 1 and the waveguide 3. Meanwhile, the embodiments of the disclosure further provide the thermally assisted magnetic head, the head gimbal assembly, and the hard disk drive.

All the above are merely preferred embodiments of the present disclosure. It should be noted that those skilled in the art may obtain modifications and equivalents without departing from the technical principle of the present disclosure. The invention is intended to cover all modifications and equivalents included within the scope of the present disclosure.

The invention claimed is:

1. A light source unit, wherein
the light source unit is applicable for a thermally assisted magnetic head, the thermally assisted magnetic head comprises a slider, and the slider is provided with a waveguide and with a first cavity for accommodating the light source unit;
a welding layer and a stopping structure are provided between the light source unit and the slider; and
wherein the light source unit is configured to move as the welding layer melts and be limited at a preset position by the stopping structure, when joined with the slider, and at the preset position, an emission opening of the light source unit aligns with the waveguide,
wherein the slider comprises a slider body and a conductive layer, wherein the conductive layer is connected to the slider body and the conductive layer is provided for connecting with the welding layer; the light source unit comprises a light source body and a first electrical connecting layer, the first electrical connecting layer is connected with the light source body, and the welding layer is configured to be provided on the first electrical connecting layer or the conductive layer.

2. The light source unit according to claim 1, wherein the stopping structure comprises at least one stop; each of the at least one stop is configured to be provided on the light source unit, and the stop is allowed to move to abut against the slider as the welding layer melts when the light source unit is joined with the slider, or,
each of the at least one stop is configured to be provided on the slider, and the stop is allowed to move to abut against the light source unit as the welding layer melts when the light source unit is joined with the slider.

3. The light source unit according to claim 2, wherein a first surface of the stop is connected to the light source body, a second surface of the stop abuts against the slider body or the conductive layer when the light source unit is joined with the slider, and the first surface of the stop is arranged opposite to the second surface of the stop.

4. The light source unit according to claim 3, wherein the at least one stop comprises at least two stops, the at least two stops define an interval space therebetween, and the first electrical connecting layer is at least partially accommodated in the interval space;
if the welding layer is configured to be provided on the first electrical connecting layer, the welding layer protrudes further than the second surface of the stop, the second surface of the stop is allowed to move to abut against the conductive layer as the welding layer melts when the light source unit is joined with the slider, such that the light source unit is stopped at the preset position; or,
if the welding layer is configured to be provided on the first electrical connecting layer, the welding layer protrudes further than the second surface of the stop, or, the second surface of the stop protrudes further than the welding layer, to allow the second surface of the stop to move to abut against the slider body as the welding layer melts when the light source unit is joined with the slider, such that the light source unit is stopped at the preset position; or,
if the welding layer is configured to be provided on the conductive layer, the second surface of the stop is allowed to move to abut against the conductive layer or the slider body as the welding layer melts when the light source unit is joined with the slider, such that the light source unit is stopped at the preset position.

5. The light source unit according to claim 4, wherein the at least two stops are arranged to define an interval space, and the at least two stops extend along a length direction or a width direction of the light source body.

6. The light source unit according to claim 2, wherein the stop extends along a length direction of the light source body, and a length of the stop is less than a length of the light source unit.

7. The light source unit according to claim 2, wherein the light source unit is a laser diode, and the light source body comprises a substrate, the light source body is formed by a deposition on the substrate, the stop is formed in a deposition process of the light source body, and a material of the stop is the same as that of the light source body.

8. The light source unit according to claim 7, wherein both the stop and the light source body are made of GaAs.

9. The light source unit according to claim 2, wherein the light source unit is a laser diode, and the light source body comprises a substrate, the light source body is formed by a deposition on the substrate, the stop is formed after a deposition process of the light source body, and a material of the stop is different from that of the light source body.

10. The light source unit according to claim 9, wherein the stop is made of a dielectric material.

11. The light source unit according to claim 2, wherein the stop is formed in a wafer process of the slider.

12. The light source unit according to claim 1, wherein the stopping structure comprise a second cavity and the first cavity, the second cavity is provided in the slider body, and the second cavity is in communication with the first cavity, to form a double-cavity structure having a step, the conductive layer is connected to the slider body and accommodated in the second cavity; when the light source unit is joined with the slider, the light source body or the first electrical connecting layer is allowed to move to abut against the step as the welding layer melts, such that the light source unit is stopped at the preset position.

13. A thermally assisted magnetic head, comprising the slider and the light source unit according to claim 1, and the light source unit is joined with the slider.

14. A head gimbal assembly, comprising the thermally assisted magnetic head according to claim 13.

15. A hard disk drive, comprising the head gimbal assembly according to claim 14.

* * * * *